(12) United States Patent
Stevens et al.

(10) Patent No.: US 7,536,721 B2
(45) Date of Patent: May 19, 2009

(54) LOW COST SECURE ID CARD AND SYSTEM

(75) Inventors: John K. Stevens, Stratham, NH (US);
Paul Waterhouse, Selkirk (CA);
Christopher W. Verge, Hamilton (CA);
Kenneth Truong, Scarborough (CA);
Jason August, Toronto (CA)

(73) Assignee: Visible Assets, Inc, Mississauga, Ontario (CA)

(*) Notice: Subject to any disclaimer, the term of this patent is extended or adjusted under 35 U.S.C. 154(b) by 0 days.

(21) Appl. No.: 11/566,135

(22) Filed: Dec. 1, 2006

(65) Prior Publication Data
US 2007/0283160 A1    Dec. 6, 2007

Related U.S. Application Data

(63) Continuation of application No. 10/832,853, filed on Apr. 27, 2004, now abandoned, and a continuation-in-part of application No. 10/415,502, filed as application No. PCT/US01/26840 on Aug. 28, 2001, now Pat. No. 7,028,339.

(60) Provisional application No. 60/466,016, filed on Apr. 28, 2003, provisional application No. 60/485,860, filed on Jul. 9, 2003, provisional application No. 60/228,555, filed on Aug. 28, 2000.

(51) Int. Cl.
*H04L 9/32* (2006.01)

(52) U.S. Cl. .............................. 726/17; 726/20; 726/21

(58) Field of Classification Search ................. 713/182, 713/184–186; 726/20, 27–30, 17, 21; 235/462.45, 235/462.46, 472.01, 472.02; 340/5.1–5.2, 340/5.21, 5.23, 5.3, 5.31, 5.33, 5.51, 5.6, 340/5.61, 5.64

See application file for complete search history.

(56) References Cited

U.S. PATENT DOCUMENTS

| | | | |
|---|---|---|---|
| 3,953,769 A | 4/1976 | Sopko | |
| 4,839,506 A | 6/1989 | Homma | |
| 4,887,445 A | 12/1989 | Beatty | |
| 4,959,788 A * | 9/1990 | Nagata et al. | ................. 705/41 |
| 5,477,039 A | 12/1995 | Lisimaque et al. | |
| 5,704,151 A | 1/1998 | West et al. | |
| 5,717,776 A | 2/1998 | Watanabe | |
| 5,787,186 A | 7/1998 | Schroeder | |
| 6,219,439 B1 | 4/2001 | Burger | |
| 6,257,486 B1 * | 7/2001 | Teicher et al. | ................ 235/380 |
| 6,535,726 B1 | 3/2003 | Johnson | |

* cited by examiner

*Primary Examiner*—Hosuk Song
(74) *Attorney, Agent, or Firm*—Larson & Anderson, LLC (57) ABSTRACT

The invention provides a method for controlling the operating state of a lock characterized by a locked state and an unlocked state. The method comprises: entering secret information on an electronic input device (e.g. keypad) located on a radio frequency identity card, then electronically comparing the secret information against an authorized code to determine whether the secret information is authorized, then transmitting by radio frequency an unlocking signal to a radio frequency reader located at the lock for opening the lock in the event that the secret information is authorized.

In a related use of such RF identity cards, the invention also provides a system and method of tracking movements of individuals within a secure area. The method comprises the steps of: using a loop antenna operable to transmit and receive RF signals from at least one radio frequency (RF) identity card carried by an individual; transmitting RF signals at a frequency not exceeding 1 megahertz from a reader through the loop antenna to the aforesaid RF card to request a secret code; entering this secret code on an electronic input device (e.g. keypad) device located on the RF card, transmitting this secret code to the reader through a transceiver disposed on the RF card; and using a data processor/CPU located at the reader to determine whether the secret code corresponds to the aforesaid authorization.

27 Claims, 7 Drawing Sheets

LOW COST SECURE ID CARD AND SYSTEM

CROSS REFERENCE TO RELATED APPLICATIONS

This application claims priority from and incorporates by reference 1) U.S. United Provisional Patent Application No. 60/466,016, filed on Apr. 28, 2003 and 2) U.S. Provisional Patent Application No. 60/485,860, filed on Jul. 9, 2003.

This application is a Continuation-In-Part of U.S. Nonprovisional patent application Ser. No. 10/415,502, filed Apr. 28, 2003, which is a U.S. national application based on PCT/US01/26840 having an international filing date of Aug. 28, 2001, which has priority based upon U.S. Provisional Patent Application No. 60/228,555, filed Aug. 28, 2000.

FIELD OF THE INVENTION

The invention relates to security systems and devices (e.g. identification cards) for locking and unlocking secure areas, such as entryways (e.g. doors, gates) and closable receptacles, and for safeguarding secure areas by verifying authorization of, and tracking, individuals located therein.

BACKGROUND OF THE INVENTION

In attempts to enhance secure identification of individuals many identification (ID) cards have been created using smart chips (such as U.S. Pat. No. 5,477,039, issued Dec. 19, 1995 to Lisimaque et al ). These chips optionally contain data storage that holds the individual's biometric date such as facial images, fingerprints, or retinal scans (such as U.S. Pat. No. 5,717,776, issued Feb. 10, 1998 to Watanabe, U.S. Pat. No. 5,787,186, issued Jul. 28, 1998 to Schroeder, and U.S. Pat. No. 6,219,439, issued Apr. 17, 2001 to Burger). To obtain entry to secure area, the individual is required to insert his/her card into a reader. The reader reads the biometric data contained on the chip and performs the detailed biometric test on the individual via devices that can read fingerprints, retinal scans, or other identifying biometric characteristics. The systems may provide very high security in areas where positive identification of the individual is required; however, the biometric readers are both expensive and complex. Such systems cannot be used reliably in high-volume areas, with many transient employees, or applications requiring routine positive identification for entry to the secure area without great cost such as airport entrances, or access to air traffic control rooms, or medium level security areas.

Other ID cards have named account numbers and other personal information encoded, either on a chip, or use a short range passive RF link, or alternatively a magnetic stripe card may be inserted into a reader capable of reading this information. In turn the individual may be asked to enter a personal identification number, or what is commonly called a PIN, on a door's keypad to obtain entry into a secure area (such as U.S. Pat. No. 4,839,506, issued Jun. 13, 1989 to Homma et al). In many other cases, a simple keypad is placed on the door and a code must be entered into the keypad to allow entry without a separate card (such as U.S. Pat. No. 4,887,445, issued Dec. 19, 1989 to Beatty, U.S. Pat. No. 3,953,769, issued Apr. 27, 1976 to Sopko, and U.S. Pat. No. 5,704,151, issued Jan. 6, 1998 to West et al, relating to a keypad on gun lock)). These keypad approaches provides only limited security when many individuals in high-volume areas such as airports, or office doors.

One major problem with systems that use a keypad located at the door, is that the codes must be frequently changed and distributed to many people on a weekly or daily basis. This process leads to significant security risks because the codes are often written down and provided in e-mail or memorandum form for the benefit of authorized individuals. It also becomes necessary to change the code whenever even a single individual leaves the employment of the company using such a keypad-guarded door. An alternative approach is to use a door with many different codes, one for each individual making use of the door. In that case, only a single code must be changed if an individual leaves employment of the company. However, as the number of codes that are capable of opening the door increases, the security level of entry decreases. In the simple case, if the door has three buttons labeled 1,2,3 and a code of only three digits for use (e.g. 3,2,1), the likelihood of entry by an unauthorized intruder is one out of nine, since there are only nine possible combinations. If the company wanted to provide unique access to four employees, giving each a unique code, the likelihood of entry by a non-authorized intruder now rises to four out of nine. In other words, an intruder enjoys almost a 50% probability of guessing a code that would allow unauthorized entry, and the security level of the door is therefore significantly decreased.

A third method of secure access, is simply to have a physical card with optional identity information associated with the card. For example, a picture, or the individuals name and address. The card may be placed in a reader to obtain access, or in some cases may transmit a signal to a reader that might open a door. The same system is used widely for automobile entry, where small "keyfobs" are used to transmit a unique signal to an automobile to open the doors and in some cases start the automobile. Again these wireless "keyfob" security system depend only upon holding onto (and not losing) a physical device to obtain entry and no independent checks of the person's actual identity or authorization to use the card or "keyfob" can be made. The security in this case is similar to the security afforded by the usual metallic mechanical key, which can be duplicated, and provides no assurance that its holder is authorized for entry.

Finally, a similar access system can be implemented using a cell phone, where a special number is called on the cell phone to make a purchase from a vending machine or gas pump. After the number is dialed, a special PIN number may be entered to verify the account holder's identity, and the machine of gas pump is unlocked (such as U.S. Pat. No. 6,535,726, issued Mar. 18, 2003, to Johnson).

SUMMARY OF THE INVENTION

The present invention provides a method, system and device (e.g. ID card) that provides enhanced security for positive identification, and for individual as well as automatic entry into a secure area.

The invention broadly provides a system for controlling the operating state of a lock comprising:
a) a lock characterized by a locked state and an unlocked state;
b) a radio frequency reader, said reader being in operative communication with a lock to control the state thereof,
c) a radio frequency identity card comprising:
  i) an electronic input device (e.g. keypad) located on said card for entry of secret information by an individual;
  ii) an electronic encoding means for facilitating conversion of said secret information into encoded secret information, said encoded secret information being determinative of authorization of said individual;
  iii) a wireless communication means (e.g. a wireless transmitter) operable to transmit information to said reader.

c) a data processor (e.g. CPU or central processing unit) operable to determine whether said secret information corresponds to said authorization.

It is preferable that the radio frequency identity card further comprise an energy storage device (e.g a battery) operable to energize the wireless transmitter, and that the aforesaid radio frequency reader and the aforesaid wireless communication means (e.g. transmitter) be operable at only a low radio frequency not exceeding 1 megahertz. It may be noted that the use of such low frequencies (e.g. 300 Khz or 128 KHz) is both unexpected, because a typical RF frequency for active cards and tags is, for example, 433 MHz, which causes a rapid drain of a battery in the card (or at a reader). The use of low frequencies (<1 MHz) is thus unexpectedly advantageous in reducing power requirements and enabling a long, practical, usable life for both the novel RF ID cards herein and for any battery-powered reader used to read the cards. The use of low RF frequencies not exceeding 1.0 MHz (when compared to the use of widely used high frequencies in the range of 100 MHz) importantly extends the life of the energy storage devices (e.g. batteries) that may be incorporated in the ID card/ID key and reader to energize their respective components, thereby greatly enhancing the utility of both RF ID key tags and of their readers.

Moreover, it is preferable that the aforesaid data processor/cpu be disposed within the aforesaid card (e.g. in the form of a microprocessor chip) and be operable to convert the encoded secret information into an unlocking signal and to provide that unlocking signal to the aforesaid wireless communication means.

Alternatively, both the aforesaid reader and data processor/cpu may be disposed at the lock, the data processor/cpu being operable to convert the encoded secret information into an unlocking signal and to provide that unlocking signal to the reader to unlock the aforesaid lock.

The invention also provides a system of tracking movements of individuals within a secure area, the aforesaid system comprising:
a) a loop antenna operable to transmit and receive RF signals from at least one radio frequency identity card;
b) a reader comprising a radio frequency transceiver operatively connected to the aforesaid loop antenna;
c) at least one radio frequency identity card which can be located within communication range of the aforesaid loop antenna, the aforesaid radio frequency identity card comprising:
  i) an electronic input device (e.g. keypad) located on the aforesaid card for entry of secret information by an individual;
  ii) an electronic encoding means for facilitating conversion of the aforesaid secret information into encoded secret information, the aforesaid encoded secret information being determinative of authorization of the aforesaid individual;
  iii) a wireless communication means (e.g. transmitter) operable to transmit information to the aforesaid reader;
d) a data processor/cpu operable to determine whether the aforesaid secret information corresponds to the aforesaid authorization.

As will be understood, the aforesaid data processor/cpu may be disposed within the card, or at the reader, and is operable to convert the encoded secret information into an authorization code.

The invention further provides an electronic identity card comprising:

a) an electronic input device (e.g. keypad) located on the aforesaid card for entry of secret information by an individual;
b) a display for displaying public information for observation, the aforesaid public information having a relationship to the aforesaid secret information; and
c) an electronic encoding means for facilitating conversion of the aforesaid secret information into encoded secret information, the aforesaid encoded secret information being determinative of the existence of a required correspondence between the aforesaid secret information and the aforesaid public information to confirm the identity of the aforesaid individual.

Preferably, the aforesaid display comprises a permanent ID label attached to the card, the aforesaid label containing public identity information relating to the aforesaid individual.

Preferably, the display comprises a LCD display on the ID card to display the aforesaid encoded secret information.

Preferably, the aforesaid identity card further comprises a low frequency (e.g. less than 1 MHz) wireless communication means (e.g. transmitter) operable to transmit the aforesaid encoded secret information to a reader spaced away from the identity card. Advantageously, the communication means may comprise a receiver for receiving a command signal from the reader and for displaying the aforesaid public information on the display in response to the aforesaid command signal.

Preferably, the novel ID card further comprises an indicator device (e.g. LED), the aforesaid communication means then comprising a receiver for receiving a command signal from the reader and for activating the indicator device in response to the aforesaid command signal.

The invention also provides an electronic identity card comprising:
a) an electronic input device (e.g. keypad) located on the aforesaid card for entry of secret information by an individual;
b) an electronic encoding means for facilitating conversion of the aforesaid secret information into encoded secret information, the aforesaid encoded secret information being determinative of authorization of the aforesaid individual;
c) a wireless communication means (e.g. a wireless transmitter) operable to transmit the aforesaid encoded secret information to a reader, the aforesaid reader being in operative communication with a lock to control a locked state thereof.

Preferably, the wireless communication means is operable at a low radio frequency not exceeding 1 megahertz.

Preferably, the aforesaid electronic encoding means comprises a data processor/CPU and a data storage device. operable to store a lookup table/database of instances of secret information and corresponding instances of encoded secret information.

Alternatively, the aforesaid electronic encoding means may comprise a data processor/CPU operable to algorithmically convert the aforesaid secret information into the aforesaid encoded secret information.

Advantageously, the aforesaid wireless communication means is operable to transmit both the aforesaid secret information and the aforesaid encoded secret information to a reader, such reader being in operative communication with a lock to control a locked state thereof.

Preferably, the aforesaid card comprises an indicator device (e.g. LED), the aforesaid communication means comprising a receiver for receiving a command signal from the aforesaid reader and for activating the aforesaid indicator device in response to the command signal.

The invention also provides a method for controlling the operating state of a lock characterized by a locked state and an unlocked state, the aforesaid method comprising:

a) entering secret information on an electronic input device (e.g. keypad) located on a radio frequency identity card,
b) electronically comparing said secret information against an authorized code to determine whether the aforesaid secret information is authorized,
c) transmitting by radio frequency an unlocking signal to a radio frequency reader located at the aforesaid lock for opening the aforesaid lock in the event that the secret information is authorized.

Preferably, the aforesaid comparing step (b) is carried out by a data processor/cpu disposed within the aforesaid card and operable to convert the aforesaid secret information into an unlocking signal and to provide such unlocking signal to a wireless communication means.

Alternatively, the aforesaid comparing step (b) may be carried out by a data processor/cpu disposed at the aforesaid reader, such data processor/cpu being operable to convert the encoded secret information into an unlocking signal and to provide such unlocking signal to the reader to unlock said lock.

The invention also provides a method of tracking movements of individuals within a secure area, said method comprising:

a) using a loop antenna operable to transmit and receive RF signals (e.g. at a low frequency under 1 megahertz, such as 128 KHz) from at least one radio frequency (RF) identity card;
b) transmitting RF signals from a reader through said loop antenna to the aforesaid RF card to request a secret code;
c) entering the aforesaid secret code on an electronic input device (e.g. keypad) device located on the aforesaid RF card,
d) transmitting the aforesaid secret code to the aforesaid reader through a transceiver disposed on the aforesaid RF card; and
e) using a data processor/cpu located at the aforesaid reader, determining whether the aforesaid secret code corresponds to the aforesaid authorization.

According to the invention, the electronic input device on the ID card may take many forms, such as a voice recognition microphone with associated software, although a simple electronic keypad is currently preferred, based on cost and simplicity considerations.

Advantageously, the benefits of the invention can be achieved by providing each individual with a intelligent ID card that includes a small low-cost keyboard, and preferably a Liquid Crystal Display (LCD), an optional light emitting diode (LED) and an short range radio or IR data link (for example, at a radio frequency (RF) of less than 1 MHz, such as 300 Khz or even 128 KHz). The use of such low frequencies is important because they extend the life (when compared to the use of widely used high frequencies in the range of 100 MHz) of the energy storage devices (e.g. batteries) that may be incorporated in the ID card/ID key to energize their respective components In a preferred embodiment of the invention, the user may wear the card on a neck chain and as the user approaches a secure entryway, an RF Base Station located at the entry-way/door would cause the LED on the card to flash, thereby indicating that the door requires a PIN number to enter. On the card's keypad, the user would then enter a secret PIN number code that is specific for this card and the card would transmit a RF signal with this PIN code to the RF reader at the entry point of this door. If the correct number was entered by the user, the door will open.

In one preferred embodiment, the secret PIN is entered on the RF card's keypad by the user and then an encrypted version of the PIN code, which had previously been stored in the card, is compared to the keypad-entered PIN code. If they match the card transmits a digital code that opens the door. This first method, makes it possible to use a low cost lock that does not require a separate database of PIN numbers. For clarity:

PIN ENTERED ON CARD KEYPAD→CARD'S CPU MATCHES PIN TO CARD DATABASE→CARD SENDS "OPEN" CODE BY RF→DOOR RF READER UNLOCKS DOORLOCK

Figure 8:
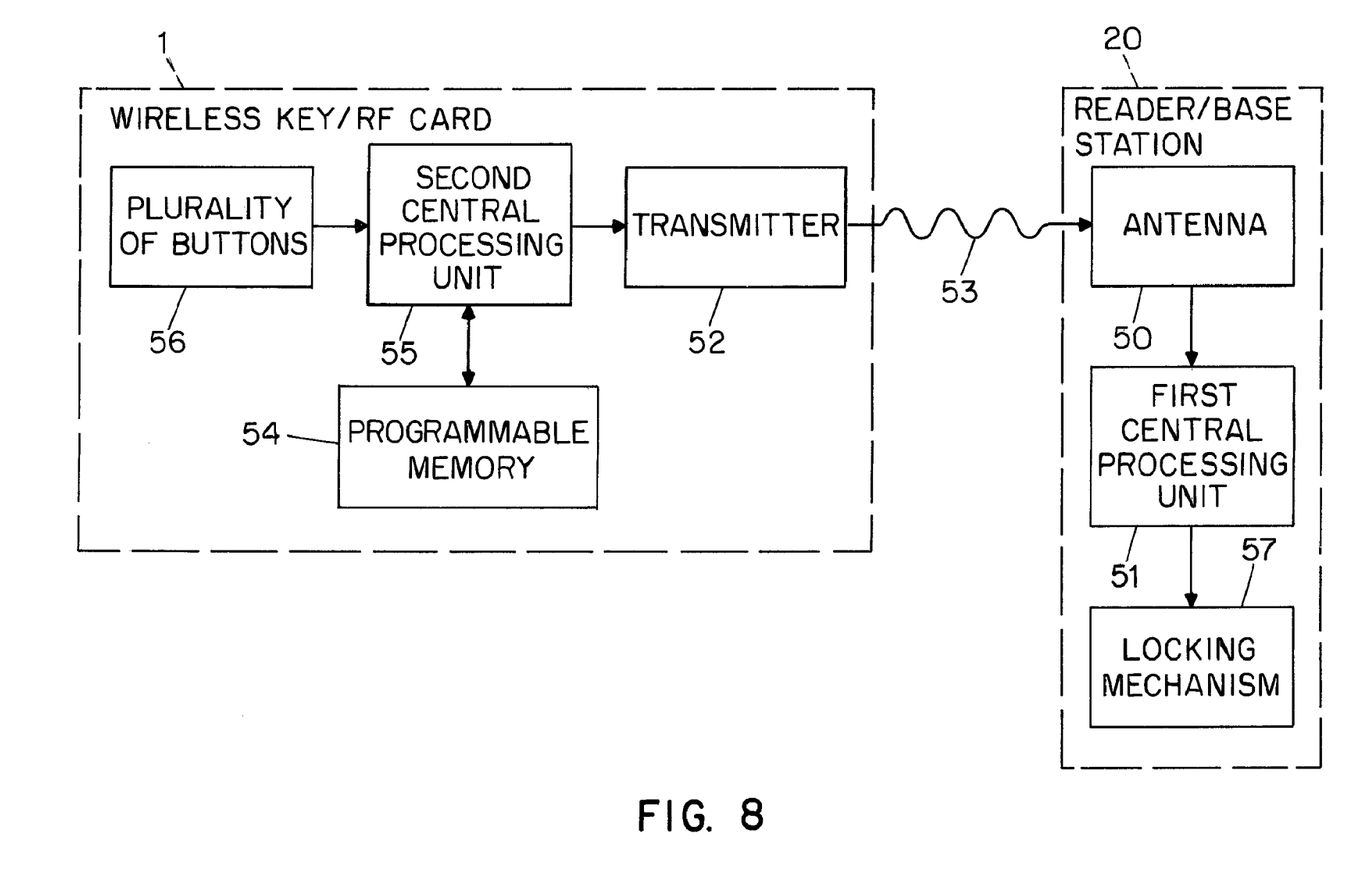
FIG. 8 is a schematic block diagram showing the interaction of an electronic lock with and an RF card that incorporates a CPU data processor (e.g. microprocessor) and database.

According to a second method, for example as illustrated in FIG. 8, the Wireless Key/RF card 1 will first confirm that the PIN number (entered at keypad buttons 56) is correct and then transmit both a special code to open the door lock (locking mechanism 57) plus the PIN number, whereupon the two numbers are compared to a database that is contained or accessed by a data processor/CPU 51 communicating with, and preferably located at, the lock 57 to first check both the PIN and the code before opening the door. For clarity:

PIN ENTERED ON CARD KEYPAD→CARD'S CPU MATCHES PIN TO CARD'S DATABASE→CARD SEND BOTH PIN CODE AND "OPEN" CODE BY RF→DOOR RF READER AND READER'S CPU CHECKS BOTH CODE NUMBERS AGAINST DOOR DATABASE→DOOR UNLOCKS

Figure 9:
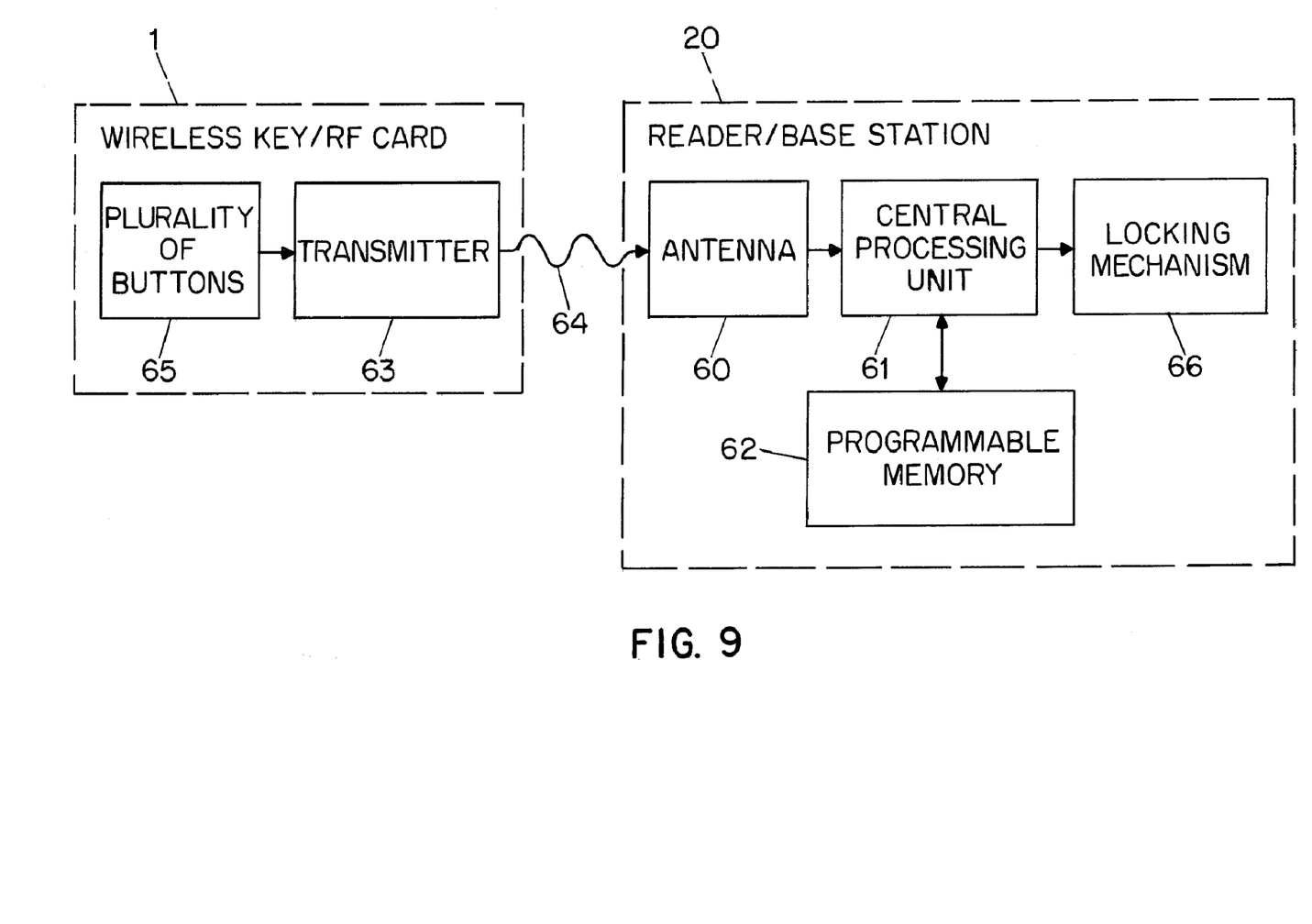
FIG. 9 is a schematic block diagram showing the interaction of an electronic lock having a CPU data processor and database with and an RF card that does not incorporate a CPU data processor.

In a third preferred embodiment, as shown in FIG. 9, the transmitter 63 of ID card 1 (Wireless Key/RF Card) may transmit only the keypad 65-entered PIN number, which is compared to a data base of access codes held in a storage device/programmable memory 62 at the door, and if correct, the door is unlocked. Again, for clarity:

PIN ENTERED ON CARD KEYPAD→CARD SENDS PIN BY RF→DOOR RF READER AND READER'S CPU CHECKS PIN AGAINST DOOR DATABASE →DOOR UNLOCKS

Preferably, an LCD display provided on the wireless ID card makes it possible to also confirm a person's actual identity, thereby ensuring that he/she is authorized to use the card. For example, when the person walks up to a secure area, a card reader, that is operable to detect the ID card, may flash the ID card's LED and may make the card's LCD display go blank via a challenge command transmitted over the low frequency (<1 MHz) RF wireless link from the reader. The user may then be prompted to enter the PIN number on buttons of the card's keypad, whereupon the data processor/CPU located in the card (or, upon RF transmittal, the CPU at the reader) calculates a public key number/indicator from the secret PIN number and causes display of that calculated public number on the LCD. The corresponding correct public number may be preprinted on a picture ID card that is attached to the ID keycard (or otherwise pre-known or predefined for comparison purposes); a security guard may then readily confirm the cardholder's identity by checking to see whether that the LCD-displayed public number matches the pre-printed/predefined public number. For clarity: READER DETECTS CARD —RF CHALLENGE TO CARD—AUTOMATIC OR KEYPAD ID RESPONSE FROM CARD→PUBLIC NUMBER CALCULATED AT CARD OR READER AND DISPLAYED AT CARD'S LCD→COMPARE CALCULATED PUBLIC NUMBER WITH PREDEFINED PUBLIC NUMBER (E.G. BY SECURITY GUARD)→AUTHORIZE/EXCLUDE CARDHOLDER As will now be understood, according to the third preferred embodiment (as further illustrated in FIG. 9), the RF card (wireless key) 1 may transmit, by low frequency RF on link 64, the secret PIN number (entered on buttons 65 of the card's keypad) to a base station (directly or via retransmission by the card reader) having a central processing unit 61 (CPU) connected thereto, whereupon the central processing unit 61 would then carry out the calculation on the secret PIN number and open a door lock (locking mechanism) 66 or transmit the results (e.g. a public key) for display on the card's LCD display (not shown). The base station can also place special codes or letters on the LCD, as a request or challenge to the cardholder to enter (on the card's keypad) other special numbers (other than the PIN), such as birth date, or Social Security Number, whereupon the validity of the entered special numbers may be confirmed by an RF-transmitted message from the base station on the card's LCD. The displayed message may also be a public code that can be matched against a public code preprinted on the ID card. These challenge questions may be calculated on the RF card or transmitted to the base station via the RF link and then computed on a central server/data processor 61, which may open the lock 66 or simultaneously transmit the results of the match to the internet or to a security department connected to a private network.

Preferably, RF card and base station will use low frequencies (e.g. under 1 MHz, such as 128 KHz) to advantageously maximize battery life in the RF ID card (and at the reader if the latter is battery powered).

If the base station interrogates cards via a loop antenna (field antenna) placed either in the floor or ceiling it is possible to localize and record an individual cardholder's progress, in position and time, as the individual proceeds through a secure facility. It is also possible, in accordance with the invention, to have a network comprising a large number of such ID's all within the reading range of one loop antenna (or interconnected set of loop antennae) that can be periodically interrogated by the base station. It should be noted that an additional advantage of low RF frequencies is that the cost of integrated circuits used for detection and transmittal of low RF frequencies is greatly reduced since CMOS based circuits may be used.

The tags may also be read and programmed by low cost handheld readers using a low frequency loop antenna communication link. Low cost locks may also be created using a simple CMOS chip set similar to that shown in FIG. 4, so that the lock and card set (together) may currently be manufactured at reasonable cost (e.g. for under $25.00).

BRIEF DESCRIPTION OF PREFERRED EMBODIMENTS

Figure 1:
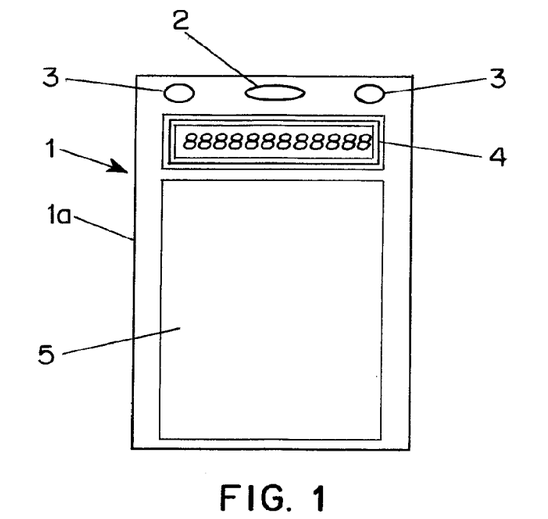
FIG. 1 is a schematic front view of an RF ID card tag/key in accordance with the present invention.

FIG. 1 illustrates the front view of a typical RF ID card/tag 1 in accordance with the invention. The card 1, in a preferred embodiment, can be approximately 2 ½ inches by three and inches (i.e. slightly larger than a typical to credit card) and approximately ⅛th inch thick. The small hole 2 shown in FIG. 1 at the top of the card 1 is intended for use with an optional chain so that the card 1 can be conveniently held around the user's neck.

Two light emitting diodes (LED's) 3 are shown in positions on either side of hole.

Figure 2:
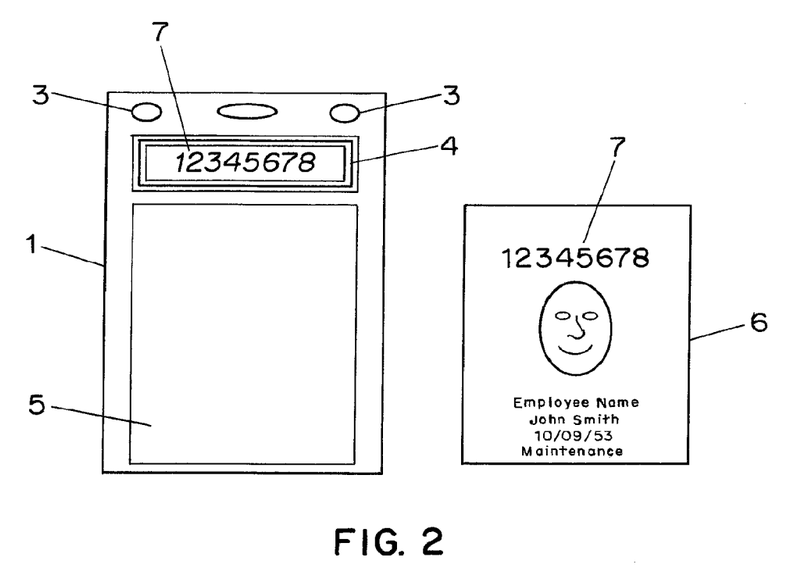
FIG. 2 is another front view of the RF ID card of FIG. 1, showing a photo ID card which may be incorporated therein.

The LED's 3 may optionally be multicolor or, alternatively, one may be green and the other red. Below the LED's 3 is shown an optional liquid Crystal Display (LCD). display 4, which may be numeric or alphanumeric. Below the display 4, an area 5 is reserved for a photo ID card 6 (as shown in FIG. 2) on flat face 1 a of card 1. A photo ID card 6 may optionally be attached by insertion into a plastic pouch adhering to the RF ID card/tag 1 by adhesive on the back of the photo ID card 6, or with adhesive directly applied to the RF card/tag, or by other mechanical means.

FIG. 2 illustrates that a photo ID card 6 may optionally be attached by a plastic pouch with adhesive on the back thereof, with adhesive directly applied to the ID photo card 6, or other mechanical means.

A desired public ID number 7 or other non-confidential sign may be printed on the RF card 1 (or on the attached photo ID card 6), so that number 7 may be visually compared to a number or sign 7 viewable in the LCD display 4 above it, by a security guard, for example. In one optional embodiment the user may be required to enter the PIN number 7 via the keypad 8 on the flat back 9 to RF card 1 (see FIG. 3 below), and the public key 7 displayed on display 4 on the front of RF card 1 is then calculated by a CPU 14 located within the RF card 1 (see FIG. 5).

In the third preferred embodiment of FIG. 9, the PIN number that is entered on the card's keypad may be sent via an RF link to a central server, which then calculates the public (non-confidential/non-secret) key and then returns that public key to the RF card for display on the LCD thereof. Other optional methods may also be used to calculate other numbers such as birth date, Social Security number, etc.

The public number is preferably long and unique and may be easily, and uniquely, calculated from a shorter secret PIN number entered on the RF card's keypad; by contrast, the secret PIN number may not be uniquely calculated from the public number. This is effectively a digital signature based on a secret 4 digit PIN password.

According to a preferred embodiment, the PIN number and the longer public ID number may be simply stored in the card's memory. The four bit microprocessor then simply compares the number entered on the keypad with the stored number and displays the public number. Thus:

PIN ENTERED ON CARD KEYPAD→CARD'S CPU MATCHES PIN TO PUBLIC NUMBER IN CARD'S DATABASE→CARD'S LCD DISPLAY'S PUBLIC NUMBER.

While it is possible for an attacker to devise a method to read these internal codes, it is easy to encrypt the stored information making it difficult for any unauthorized person to obtain the PIN number. A given public number may have many thousands of possible corresponding four digit PIN numbers. Since this public key calculation may be calculated by a CPU (programmed with a decryption algorithm) within the card, therefore neither the secret PIN number nor the corresponding public key number need be stored within a data storage device on the card itself. Thus, if sophisticated illegal attempts are made to crack card, these individuals will only be able to develop a large number of PIN number guesses. There are many public-key encryption/decryption algorithms available. Perhaps the most common is RSA, although others are also widely used, notably DSA (otherwise known as DSS, which is the USA federal Digital Signature Standard) and these would typically be calculated by a central server and not "on-card". However, algorithmic decryption methods that are easy to calculate, with minimal computational resources, would be preferred in this RF ID card.

Figure 3:
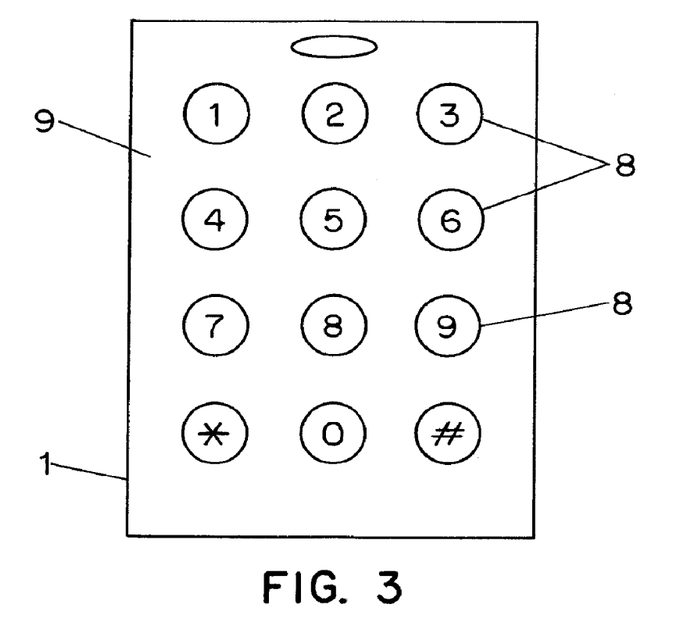
FIG. 3 is a schematic rear view showing the back of the RF ID card of FIG. 1 and the keypad of keys thereon.

FIG. 3 illustrates the back view of the ID tag, in a preferred embodiment. Small buttons 8 of a keypad with symbols including * and # may be placed on the backside of the ID card 1 using rubber dome switches, or alternatively conventional membrane switches may be used to create a very flat profile. This keypad of entry buttons 8 may be used for a variety of purposes including entry of secret PIN numbers, birthdates, Social Security numbers, or the like, which are known only to the individual carrying the ID card 1.

Figure 4:
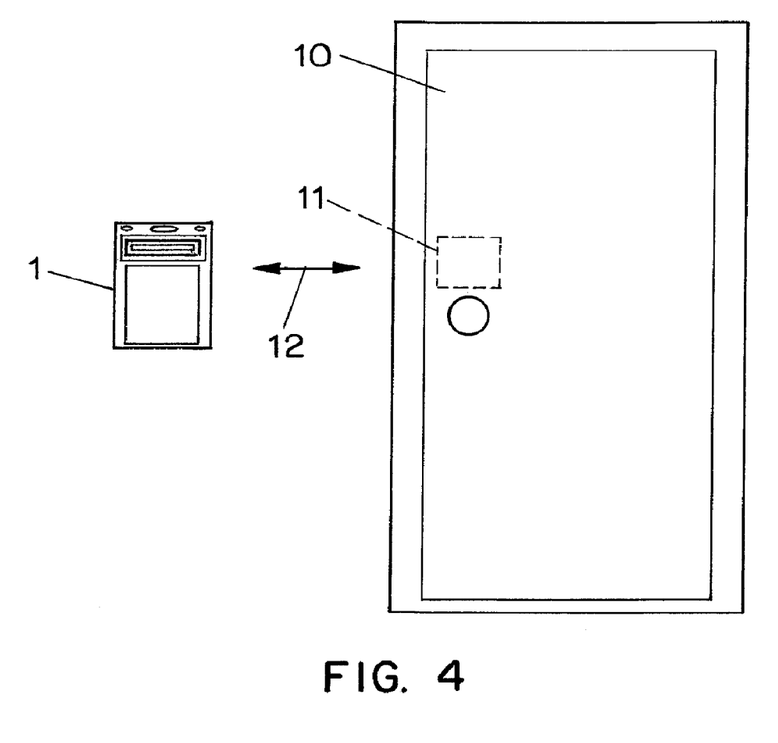
FIG. 4 is a schematic view of a novel RF ID card being used to open an electronic lock at a closed door.

FIG. 4 illustrates the preferred use of the RF ID card 1 (which may herein sometimes be called an "RF key" or "RF tag") in opening a secure door 10 when brought within an effective transmission/communication range 12. If low frequencies (e.g. 128 KHz) are used for the RF ID communication link, it is possible to build an electronic lock 11, energized by long-lasting batteries (not shown), that can be placed within the thickness of the door 10. A preferred low power lock system is disclosed in U.S. provisional application No. 60/485,860, filed Jul. 9, 2003, and entitled Integrated Lock, Drop-Box, and Delivery System and Method". The user may open the door 10 using an RF ID card 1, or a card 1 and secret PIN number without any connection to a server of computer. This embodiment provides for a secure low cost access system that does not require any external wiring. Additionally, the door 10 may have no key pads or other visible objects or markings to indicate that it is a secure entryway.

Figure 5:
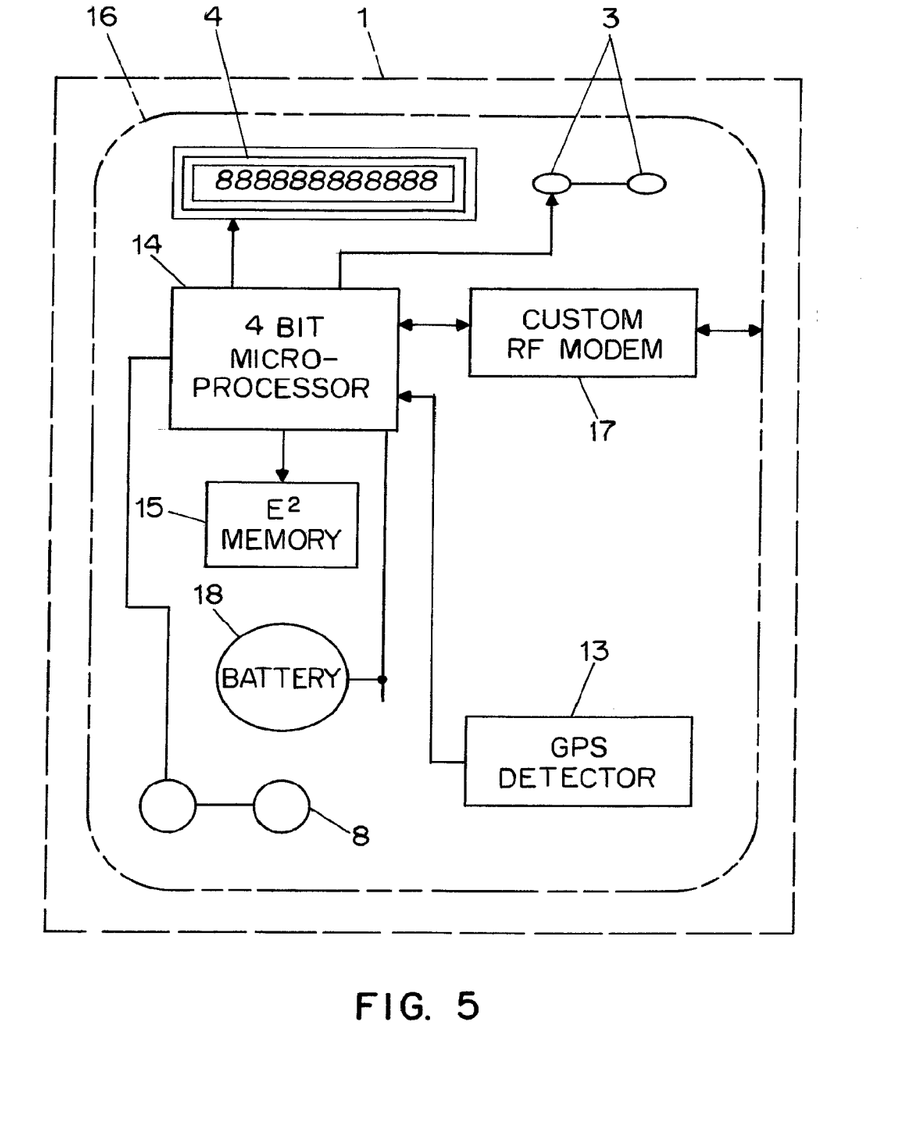
FIG. 5 is a schematic block diagram of typical functional components of an RF ID card of the type shown in FIG. 1.
Figure 6:
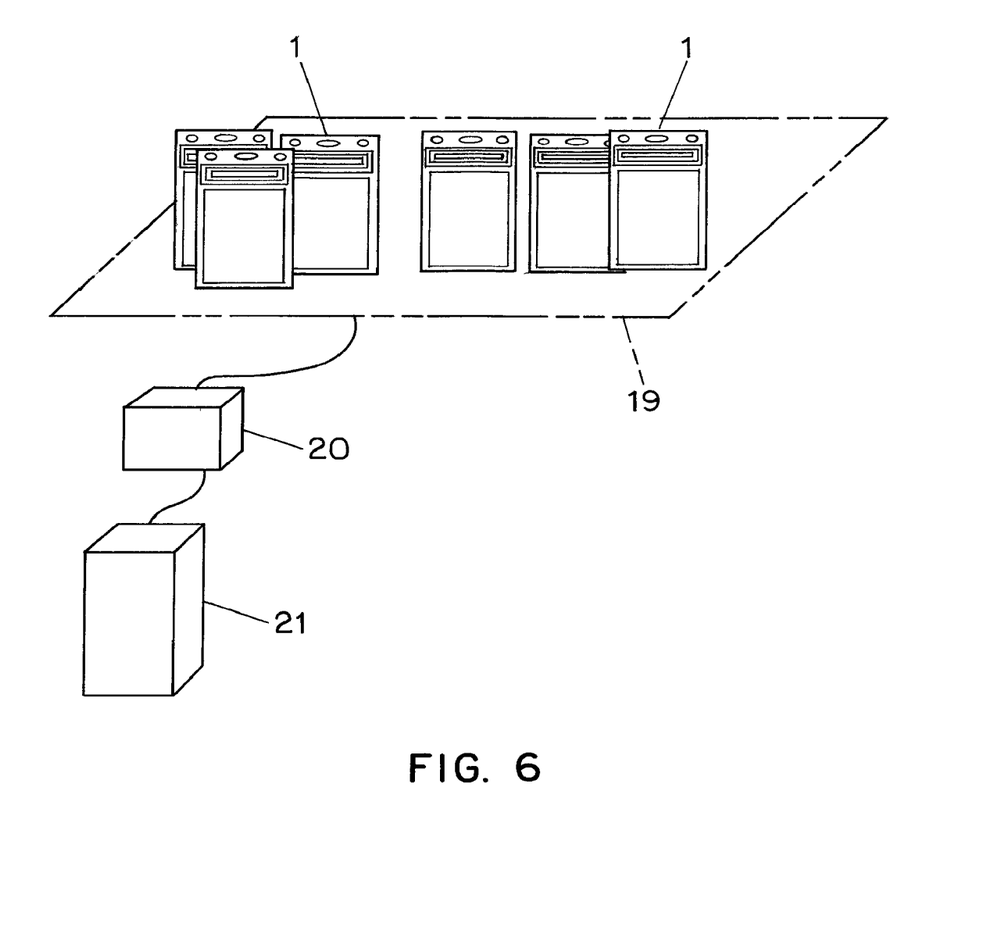
FIG. 6 is a schematic view of a system, in accordance with the invention, for tracking movements of individuals within a secure area, each individual being provided with an RF ID card of the type illustrated in FIGS. 1-3.

FIG. 5 shows a block diagram of the functional component sections of a novel wireless key or RF access card 1, including an optional GPS chip set or GPS detector 13 to help locate the geographical position of a card user. FIG. 5 also shows the LCD display 4, a 4-bit microprocessor/CPU 14, a memory (data storage device) 15, an energy storage device in the form of a battery 18, a loop antenna 16, an RF modem serving as a transceiver 17 for communicating with a reader (as shown in FIG. 6 as base station VVVV), and buttons 8 to enter commands (e.g. Open/close). As will be understood, keypad data entry buttons 8 may be located on the RF card 1 and connected to the CPU 14 for operations such as comparison by the CPU 14 of keypad-entered numbers with those stored in the memory 15 or displayed on the LCD display 4.

FIG. 6 illustrates another use of the RF cards 1, for tracking the location of individuals within a secure area. By placing large (e.g. 50 feet in diameter) field loop antennas 19 in walls, floor, or ceiling of a secure building, it is possible to create a network of wireless keys or RF access cards 1 carried by an individual after entering the secure building or secure area. Each RF card 1 can transmit at low frequency (<1.0 MHz), via a field antenna 19, to the base station/reader 20, which is connected to CPU/server 21, to confirm that each RF card 1 is present in the loop 19. By placing many such field loops 19 throughout a building it is possible to track, with full 2-way Rx/Tx 12, dates and times that individuals (bearing RF cards 1) walked into antenna-equipped areas within the building, or to track the locations and identities of individuals who were in a secure area at any time.

Figure 7:
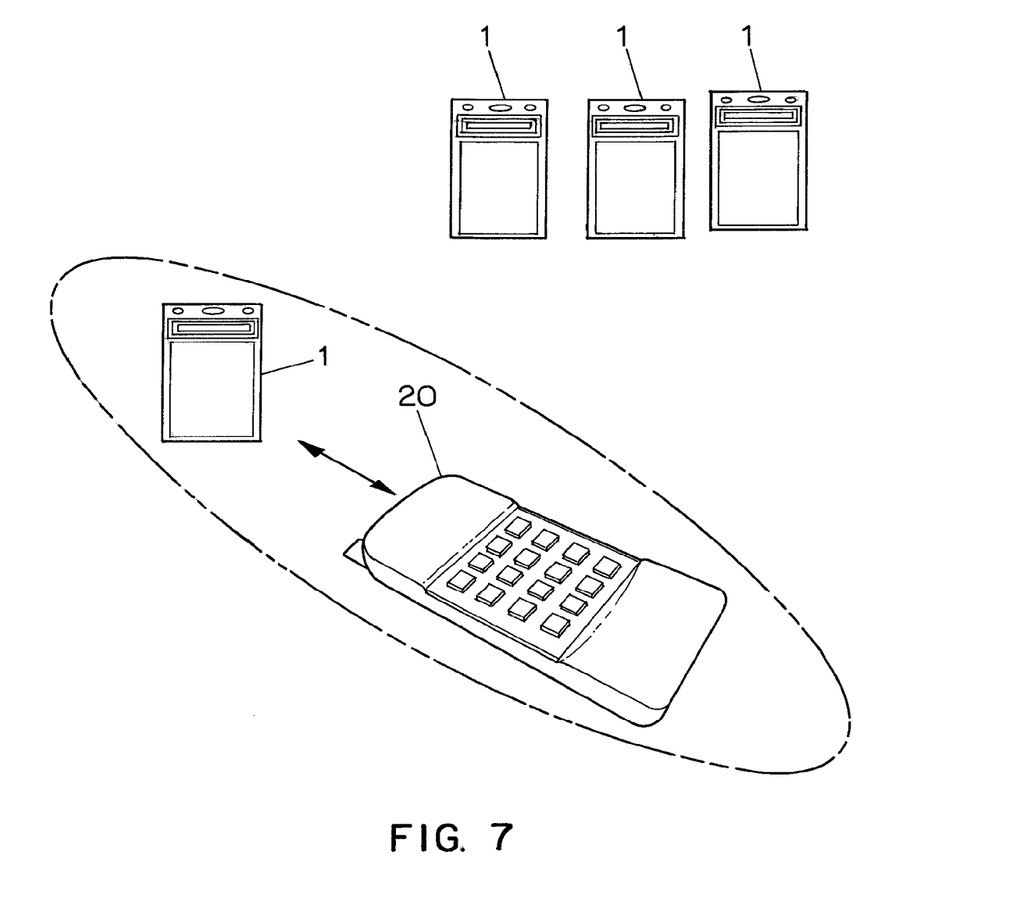
FIG. 7 is a schematic view of a handheld reader being used to check the identity of an ID card selected from a group of ID cards carried by corresponding cardholders.

FIG. 7 illustrates the use of a small handheld reader 20 with a limited range of reception and transmission (i.e. Rx/Tx 12) to nearby RF cards 1. This reader 20 can be used to check identity of an RF cardholder, and optionally to program an RF card 1 for a new identity, when authorized.

In an embodiment of the invention, as shown in FIG. 8, a receiving unit or reader/base station 20 comprises an antenna 50 and a first central processing unit 51. The reader 20 is cooperatively positioned at a secure entryway, the first central processing unit 51 communicatively connected to the reader's antenna 50, and the reader's antenna communicatively connected to a transmitter 52 of a wireless key/RF card 1 via a wireless link 53, advantageously at a low RF frequency of less than 1 MHz (e.g. 300 Khz or 128 KHz). The wireless key/RF card 1 comprises a programmable memory 54, a second central processing unit 55, and a transmitter 52 (which should be understood to include an antenna and a receiving section), the wireless key 1 being physically separate from the secure doorway and typically stored in locations inaccessible to unauthorized users of the secure door. The wireless key 1 further comprises a key pad 56 with a plurality of buttons, the buttons being used to enter a secret access code. The second central processing unit 55 of the wireless key proceeds to determine whether the access code entered is consistent with the access code stored in the programmable memory 54. Upon the second central processing unit 55 determining that the access code entered is acceptable, the transmitter 52 of the wireless key/RF card 1 transmits a signal to the reader's antenna 50 when the user pushes an appropriate "OPEN" button. The first central processing unit 51 receives a signal from the antenna 50 and subsequently disengages the locking mechanism 57 to allow access to the interior of the secure door or area.

Another embodiment of the invention, as shown in FIG. 9, involves a receiving unit or reader/base station 20 comprising an antenna 60, a programmable memory 61, and a central processing unit 62. The reader 20 is cooperatively positioned within a secure area at a secured entryway, with the central processing unit 61 communicatively connected to the reader antenna 60 and the programmable memory 62, and the reader antenna 60 communicatively connected to a transmitter 63 of a wireless key via a wireless link 64, preferably at a low RF frequency of less than 1 MHz (e.g. 300 Khz or 128 KHz). The wireless key 1 comprises a transmitter 63 (which should be understood to include an antenna and a receiving section) that transmits a plurality of unlocking signals in sequential order, with one unlocking signal being sent upon the pushing of one of the buttons of the keypad 65 of the wireless key/RF card 1. The plurality of unlocking signals are received by the antenna 60 of reader 20 and processed by the central processing unit 61. If the sequence of unlocking signals transmitted by the wireless key 1 is consistent with the access code stored in the programmable memory 62, then the central processing unit 61 disengages the locking mechanism 66 of the secure door, thereby allowing the user of the wireless key/RF card 1 to be permitted access to the interior of the secure area.

While the present invention has been described with reference to preferred embodiments thereof, numerous obvious changes and variations may readily be made by persons skilled in the fields of identification cards and security systems. Accordingly, the invention should be understood to include all such variations to the full extent embraced by the claims.

What is claimed is:

1. A system for controlling the operating state of a lock comprising:
   a) a lock for controlling physical access to a secure area characterized by a locked state and an unlocked state;
   b) a radio frequency reader, said radio frequency reader being in operative communication with the lock to control the state thereof;
   c) a radio frequency identity card comprising:
      i) an electronic input device located on said radio frequency identity card for entry of secret information by an individual;
      ii) an electronic encoding means for facilitating conversion of said secret information into encoded secret information, said encoded secret information being determinative of authorization of said individual;
      iii) a wireless transmitter operable to transmit information to said radio frequency reader; and
   d) a data processor operable to determine whether said secret information corresponds to said authorization.

2. A system as set forth in claim 1, said radio frequency identity card further comprising an energy storage device operable to energize said wireless transmitter, said radio frequency reader and said wireless transmitter being operable at a low radio frequency not exceeding 1 megahertz.

3. A system as set forth in claim 1, said data processor being disposed within said card and operable to convert said encoded secret information into an unlocking signal and provide said unlocking signal to said wireless transmitter.

4. The system as set forth in claim 1, said radio frequency reader and said data processor /cpu being disposed at said lock, said data processor being operable to convert said encoded secret information into an unlocking signal and provide said unlocking signal to said radio frequency reader to unlock said lock.

5. A system of tracking movements of individuals within a secure area, said system comprising:
   a) a loop antenna operable to transmit and receive RF signals from at least one radio frequency identity card;
   b) a reader comprising a radio frequency transceiver operatively connected to said loop antenna;
   c) at least one radio frequency identity card which can be located within communication range of said loop antenna, said radio frequency identity card comprising:
      i) an electronic input device located on said radio frequency identity card for entry of secret information by an individual;
      ii) an electronic encoding means for facilitating conversion of said secret information into encoded secret information, said encoded secret information being determinative of authorization of said individual;
      iii) a wireless transmitter operable to transmit information to said reader; and
   d) a data processor operable to determine whether said secret information corresponds to said authorization, wherein said loop antenna is disposed to transmit RF signals to and receive RF signals from a location within the secure area, whereby the movement of an individual carrying the radio frequency identity card within the secure area can be tracked.

6. The system as set forth in claim 5, said data processor being disposed within said card and operable to convert said encoded secret information into an authorization code.

7. The system as set forth in claim 5, said data processor being disposed at said reader and operable to convert said encoded secret information into an authorization code.

8. The system as set forth in claim 5, said radio frequency identity card further comprising an energy storage device operable to energize said wireless transmitter, said radio frequency reader and said wireless transmitter being operable at a low radio frequency not exceeding 1 megahertz.

9. An electronic identity card comprising:
   a) an electronic input device located on a card for entry of secret information by an individual;
   b) a first display for displaying public information for observation, said public information having a relationship to said secret information;
   c) an electronic encoding means for facilitating conversion of said secret information into encoded secret information, wherein the encoded secret information is the same as the pubic information when the secret information is entered is the correct information for the electronic identity card, and
   d) a second display for displaying the encoded secret information, whereby said encoded secret information can be compared for correspondence between said encoded secret information and said public information to confirm the identity of said individual.

10. The identity card as set forth in claim 9, said first display comprising a permanent ID label attached to said card, said label containing public identity information relating to said individual.

11. The identity card as set forth in claim 9, said second display comprising a LCD display on the ID card to display said encoded secret information.

12. The identity card as set forth in claim 9, said identity card further comprising: a low frequency wireless communication device operable at a frequency not exceeding 1 megahertz to transmit said encoded secret information to a reader spaced away from said identity card; and said identity card further comprising an energy storage device operable to energize said wireless transmitter.

13. The identity card as set forth in claim 12, said low frequency wireless communication device comprising a receiver for receiving a command signal from said reader and for displaying said public information on said display in response to said command signal.

14. The identity card as set forth in claim 12, said card comprising an indicator device, said low frequency wireless communication device comprising a receiver for receiving a command signal from said reader and for activating said indicator device in response to said command signal.

15. An electronic identity card comprising:
   a) an electronic input device located on card for entry of secret information by an individual;
   b) an electronic encoding means for facilitating conversion of said secret information into encoded secret information, said encoded secret information being determinative of authorization of said individual; and
   c) a wireless communication device operable to transmit said encoded secret information to a reader, said reader being in operative communication with a physical lock disposed to control physical access to secure area to control a locked state thereof.

16. The electronic identity card as set forth in claim 15, said identity card further comprising an energy storage device operable to energize said wireless communication device, said wireless communication device being operable at a low radio frequency not exceeding 1 megahertz.

17. The electronic identity card as set forth in claim 15, said electronic encoding means comprising a data processor/CPU and a data storage device operable to store a lookup table/database of instances of secret information and corresponding instances of encoded secret information.

18. The electronic identity card as set forth in claim 15, said electronic encoding means comprising a data processor/CPU operable to algorithmically convert said secret information into said encoded secret information.

19. The electronic identity card as set forth in claim 18, said wireless communication device being operable to transmit both said secret information and said encoded secret information to a reader, said reader being in operative communication with a lock to control a locked state thereof.

20. The electronic identity card as set forth in claim 15, said card comprising an indicator device said communication device comprising a receiver for receiving a command signal from said reader and for activating said indicator device in response to said command signal.

21. A method for controlling the operating state of a physical lock for controlling physical access to a secure area characterized by a locked state and an unlocked state; said method comprising:
   a) entering secret information on an electronic input device located on a radio frequency identity card,
   b) electronically comparing said secret information against an authorized code to determine whether said secret information is authorized, and
   c) transmitting by radio frequency an unlocking signal to a radio frequency reader located at said physical lock for opening said lock in the event that the secret information is authorized and thereby allowing physical access to the secure area.

22. The method as set forth in claim 21, said radio frequency being a low radio frequency not exceeding 1 megahertz.

23. The method as set forth in claim 21, said comparing step (b) being carried out by a data processor disposed within said card and operable to convert said secret information into an unlocking signal and provide said unlocking signal to a wireless communication device.

24. The method as set forth in claim 21, said comparing step (b) being carried out by a data processor disposed at said reader, said data processor being operable to convert said encoded secret information into an unlocking signal and provide said unlocking signal to said reader to unlock said lock.

25. A method of tracking movements of individuals within a secure area, said method comprising:
   a) using a loop antenna operable to transmit and receive RF signals from at least one radio frequency (RF) identity card at a location within the secure area;
   b) transmitting RF signals from a reader through said loop antenna to said RF identity card to request a secret code, and thereby generating at the RF identity card a request for entry of said secret code if the card is at a location where the signal is received,
   c) entering said secret code on an electronic input device located on said RF identity card,
   d) transmitting said secret code to said reader through a transceiver disposed on said RF identity card; and
   e) using a data processor located at said reader, determining whether said secret code corresponds to said authorization, thereby tracking the tracking the movements of individuals carrying the RF identity card within the secure area.

26. A method of tracking movements of individuals within a secure area, said method comprising:
   a) using a loop antenna operable to transmit and receive RF signals from at least one radio frequency (RF) identity card at a location within the secure area;
   b) transmitting RF signals from a reader through said loop antenna to said RF identity card to request a secret code, and thereby generating at the RF identity card a request for entry of said secret code if the card is at a location where the signal is received;
   c) entering said secret code on an electronic input device located on said RF identity card,
   d) using a data processor located on said RF card, determining whether the entered secret code corresponds to said authorization; and
   e) transmitting an authorization code to said reader through a transceiver disposed on said RF card, thereby tracking the movements of individuals carrying the RF identity card within the secure area.

27. A method as set forth in claim 26, said radio frequency not exceeding 1 megahertz.

* * * * *